US006290264B1

United States Patent
Inoue

(10) Patent No.: US 6,290,264 B1
(45) Date of Patent: Sep. 18, 2001

(54) PIPING STRUCTURE

(75) Inventor: Tomoki Inoue, Inuyama (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/791,709

(22) Filed: Feb. 26, 2001

(30) Foreign Application Priority Data

Feb. 24, 2000 (JP) .................................................. 12-047231

(51) Int. Cl.[7] .................................................... F16L 35/00
(52) U.S. Cl. .............................. 285/81; 285/87; 285/114; 285/921
(58) Field of Search .................................. 285/81, 87, 88, 285/114, 305, 319, 313, 921, 93

(56) References Cited

U.S. PATENT DOCUMENTS

| 3,807,774 | * | 4/1974 | Heath, Jr. ............................ 285/87 |
| 4,230,109 | * | 10/1980 | Geiss .................................... 285/114 |
| 4,358,140 | * | 11/1982 | Jonsson ................................. 285/81 |
| 4,826,486 | * | 5/1989 | Palsrok et al. ........................ 285/114 |
| 5,248,306 | * | 9/1993 | Clark et al. ............................ 285/87 |
| 5,354,102 | * | 10/1994 | Carman ................................. 285/81 |
| 5,468,024 | * | 11/1995 | Carman et al. ........................ 285/81 |
| 5,628,531 | * | 5/1997 | Rosenberg et al. .................... 285/87 |
| 5,772,258 | * | 6/1998 | Dyer et al. ........................... 285/114 |
| 5,873,608 | * | 2/1999 | Tharp et al. ......................... 285/114 |
| 5,957,894 | * | 9/1999 | Kerwin ................................. 285/87 |

FOREIGN PATENT DOCUMENTS

| 4241385 | * | 6/1993 | (DE) .................................... 285/114 |
| 4-296291 | * | 10/1992 | (JP) ...................................... 285/81 |
| 9-269008 | * | 9/1997 | (JP) . |

* cited by examiner

Primary Examiner—Eric K. Nicholson
(74) Attorney, Agent, or Firm—Oblon, Spivak, McClelland, Maier & Neustadt, P.C.

(57) ABSTRACT

A resin tube 9 inserted and fixed to one end of a female connector 10 and a corresponding pipe 11 connected by snap in to the other end of a female connector 10 are fixed by a first holding means 17 and a second holding means 18 of a holder member 16 respectively. Holding portion of either the resin tube 9 and the corresponding pipe 11 is located off the common axis L as securely held by the holder member 16. Either the resin tube 9 or the corresponding pipe 11 is turned about the female connector 10 so as to connect with either the first holding means 17 or the second holding means 18.

1 Claim, 3 Drawing Sheets

PIPING STRUCTURE

BACKGROUND OF THE INVENTION

The present invention relates to a piping structure for joining tubes or pipes or the like in a vehicle by using a female connector and particularly to a piping structure without relative turning movement of a female connector and a pipe which are not bound by each other.

A variety of female connectors have been provided for joining tubes or pipes or the like in a vehicle. Such a female connector is generally made of a synthetic resin or metallic material which fixedly joins at one end to a resin tube or the like and in the form of a retainer at the other end to a corresponding pipe or the like as a male member, hence coupling between the resin tube and the corresponding pipe.

One of such conventional female connectors is illustrated as a quick connector in FIG. 5. The female connector denoted by 10 comprises a first connecting end 1 extended straight at one end for joining to the resin tube and a second connecting end 20 at the other end for engagement with the corresponding pipe to be joined as having a retainer 2 therein. The retainer 2 may be arranged of substantially a tubular shape which becomes gradually greater in the diameter from one end to the other end. The retainer 2 is also elastically deformable by having at least one axially extending slit. Accordingly, as the retainer 2 is inserted into the female connector 10, its diameter becomes smaller until a pair of detents 2a provided on the outer surface engages with and snaps in windows 3a or concave portion provided in a housing 2 of the female connector 10.

When the insertion end 11a of the corresponding pipe 11 is inserted into the opening of the second connecting end 20 of the female connector 10 extending straight, an annular projection 11b provided on the outer surface of the insertion end 11a snaps in and engages with a small diameter recess 2b at one end of the retainer 2 so that the insertion end 11a is concentrically and turnably joined along the common axis L with the second connecting end 20 of the female connector 10 to prevent the corresponding pipe 11 from moving in axial direction. The retainer 2 has a pair of operating arms 4 provided integrally on the other end thereof. When the operating arms 4 are pressed inwardly in diameter direction to reduce the diameter, the retainer 2 with the corresponding pipe 11 can be removed from the female connector 10. Also, the female connector 10 has an annular sealing member 5 such as an o ring mounted to the inner wall of the housing 3 of a central region thereof.

In the piping structure having such a female connector 10, a resin tube (not shown) is irrotatably fixedly inserted onto the outer periphery of the first connecting end 1 of the female connector 10 while the corresponding pipe 11 joined to the second connector end 20 may turn about the common axis L relatively to the female connector 10. Accordingly, any engine vibration of the vehicle or an unexpected vibration or small displacement or the like at the side of the resin tube or the corresponding pipe 11 may cause the female connector 10 and the corresponding pipe 11 to be turned relative to each other. When the female connector 10 and the corresponding pipe 11 are turned relative to each other, the annular sealing member 5 contacting between them will be rubbed and worn out thus, its sealing effect will be declined.

A means for inhibiting the turning movement of the female connector and the corresponding pipe relative to each other is disclosed, for example, in Japanese Patent Laid-open Publication (Heisei)9-269008 in the form of a piping structure where the female connector has two opposite flat regions provided on the outer surface thereof for inhibiting the turning movement. As shown in FIG. 4, the piping structure has a connector holder 12 later connected to the female connector 10 which has joined between a resin tube 9 and a corresponding pipe 11. While an arm 14 of the connector holder 12 snaps on the small-diameter region 10b of the female connector 10, a pair of opposite strips 13 of the connector holder 12 holds the two flat regions 10a of the female connector 10. Also, the corresponding pipe 11 is bent and held in a notch 15a provided in a flat body 15 of the connector holder 12 so that it can be inhibited from turning.

According to the conventional piping structure, as long as the corresponding pipe 11 is bent above the extension of the female connector 10, the corresponding pipe 11 can thus be inhibited from being turned relative to the female connector 10. It is however mandatory for the female connector 10 held by the connector holder 12 to have the small-diameter region 10b and the paired opposite flat sides 10a on the outer peripheral. Accordingly, the female connector of at least a round tubular shape is not permitted.

SUMMARY OF THE INVENTION

The present invention is invented in view of the above aspects and its object is to provide a piping structure which is easily applicable to any female connector regardless of the type and shape of the female connector and high in the freedom for designing while securely inhibiting the turning of the female connector relative to its corresponding pipe to be joined.

For achievement of the object, a piping structure according to the present invention having a female connector and a corresponding pipe to be connected with the female connector, both arranged to join each other while allowing no relative turning movements, comprises:

the female connector of a tubular shape having a first connecting end portion thereof extending straight for connection to a resin tube and a second connecting end portion thereof extending straight for connection to said corresponding pipe;

the resin tube fixedly inserted at one end to the first connecting end portion of the female connector and extending to the other end;

the corresponding pipe having an insertion end thereof arranged for joining coaxially and turnably by snap fastening to the second connecting end portion of the female connector and extending along the axial direction; and a holder member having a first holding means for holding an extension of the resin tube and a second holding means for holding an extension of the corresponding pipe, wherein when the insertion end of the corresponding pipe has been inserted into and joined coaxially and turnably with the second connecting end portion of the female connector along the common axis, either a tube extension of the resin tube or a pipe extension of the corresponding pipe which is arranged off the common axis is turned about the common axis until at least one portion of these extension snaps and fits into at least one of the first and second holding means.

The structure of the present invention permits the female connector and the corresponding pipe to be inhibited from being turned relative to each other. Accordingly, the annular sealing member such as an O ring mounted in the female connector remains free from being rubbed by the corresponding pipe and finally worn out, hence providing its excellent sealing effect for a long-run operation. Also, the female connector joined to the resin tube and the corresponding pipe are not limited in the type and shape. In particular, because the structure of the present invention is easily applicable to any female connector, its design can enjoy a higher degree of freedom.

DETAILED DESCRIPTION OF THE PREFERRED EMBODIMENTS

In the piping structure according to the present invention, the corresponding pipe is joined to the resin tube by a holder member but not the female connector so that the relative turning movement between the corresponding pipe and the female connector can be inhibited. Since the female connector is thus not limited in the shape or size and needs not to have two opposite flat regions on the outer side thereof (at the width across the flats), the freedom for designing the piping structure can be improved.

Figure 1:
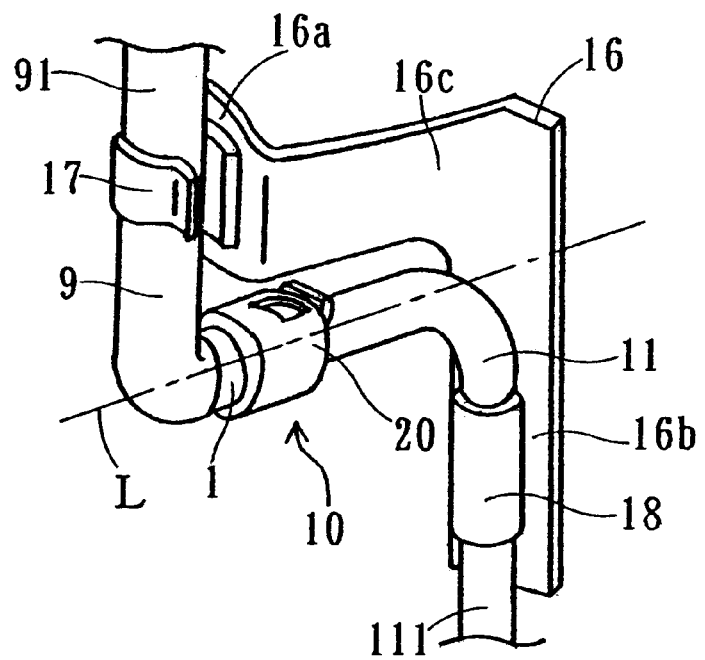
FIG. 1 is a perspective view schematically showing an embodiment of the piping structure according to the present invention.
Figure 5:
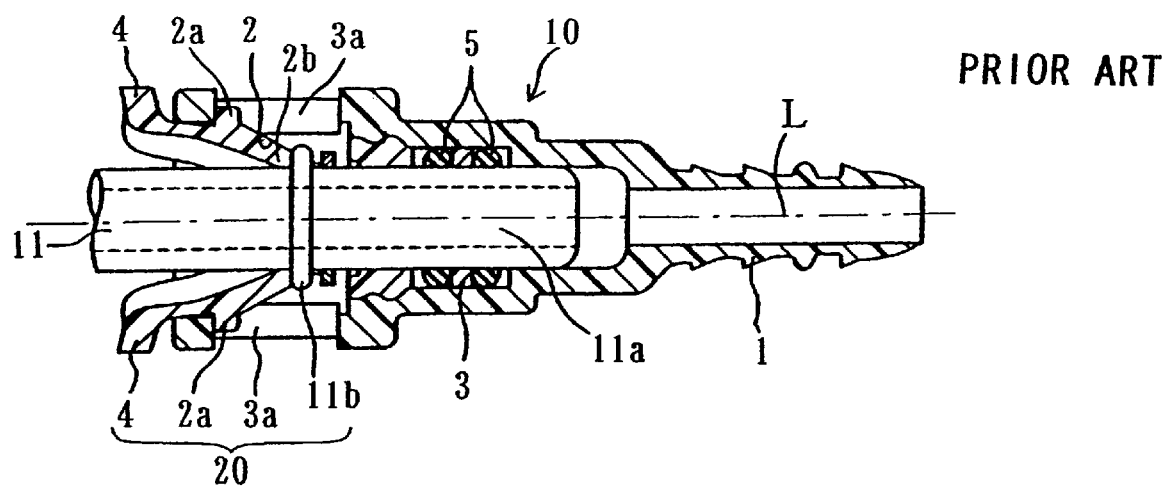
FIG. 5 is a cross sectional view schematically showing a female connector.

One embodiment of the piping structure of the present invention will be described referring to FIG. 1. The piping structure has a female connector 10, shown in FIG. 5, fixedly connected at outer periphery of its straight extending, first connecting end 1 with a resin tube 9 and at its straight extending, second connecting end 20 with a corresponding pipe 11. The resin tube 9 is held by a first holding means 17 of a holder member 16 while the corresponding pipe 11 is held by a second holding means 18 of the holder member 16. The female connector 10 is not limited in the type and shape as mentioned above but may be a quick connector, such as shown in FIG. 5, in this embodiment which can be joined to the corresponding pipe 11 by snap fastening.

The holder member 16 is made of a resin or metallic material having a first holding means 17 for holding the resin tube 9 and a second holding means 18 for holding the corresponding pipe 11, both arranged off the common axis L along which an insertion end 11a of the corresponding pipe 11 is joined by snap fastening to the second connecting end 20 of the female connector 10. More specifically, in the embodiment shown in FIG. 1, the holder member 16 has a first flat portion 16a thereof linked with the first holding means 17 and a second flat portion 16b thereof linked with the second holding means 18, and both are arranged in parallel to each other and at an right angle to the common axis L. The first flat portion 16a and the second flat portion 16b are linked to each other integrally by a third flat portion 16c. This allows the first holding means 17 and the second holding means 18 to extend substantially at a right angle to the common axis L along which the insertion end 11a of the corresponding pipe 11 is inserted and joined to the straight extending, second connecting end 20 of the female connector 10.

Figure 2:
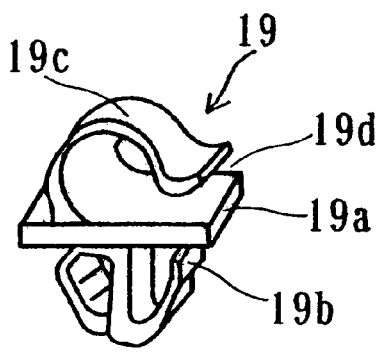
FIG. 2 is a perspective view schematically showing a C clip used in the piping structure according to the present invention.

While the first holding means 17 and the second holding means 18 of the holder member 16 are not limited to particular models, at least one of them is preferably arranged for fitting with the fitting portion of either the resin tube 9 or the corresponding pipe 11 turned about the common axis L. More specifically, the first holding means 17 in this embodiment may be a C clip such as shown in FIG. 2. The C clip denoted by 19 comprises a flat base portion 19a, a mounting portion 19b extending in an anchor form from one side of the flat base portion 19a for snapping into an aperture provided in the holder member 16, and a C-shaped engaging portion 19c mounted on the other side of the flat base portion 19a. In action, the resin tube 9 is inserted through an opening 19d and held in the engaging portion 19c.

The holder member 16 is coupled to a tube extension 91 of the resin tube 9 extending from one end to another end and a pipe extension 111 of the corresponding pipe 11 extending from the insertion end 11a, both of which are connected to the female connector 10 and are located off the common axis L along which the insertion end 11a of the corresponding pipe 11 is inserted and joined to the female connector 10. More particularly, the resin tube 9 and the corresponding pipe 11 are bet to an L shape and they become a crank-like form when the female connector 10 and the corresponding pipe 11 are joined to each other as shown in FIG. 1. While the insertion end 11a of the corresponding pipe 11 remains inserted and joined to the second connecting end 20 of the female connector 10, the resin tube 9 and the corresponding pipe 11 are securely held at their holding portions of the holder member 16 extending substantially at a right angle to the common axis L by the first holding means 17 and the second holding means 18 respectively. In this embodiment, as the first connecting end 1 and the second connecting end 20 of the female connector 10 are aligned with each other, the resin tube 9 is bent to an L shape. Alternatively, in case that the intermediate between the first connecting end 1 and the second connecting end 20 of the female connector 10 is bent to an L shape in advance, the resin tube 9 may extend straight and be held by the holding means.

A procedure of assembling the piping structure of this embodiment starts with attaching the part of the pipe extension 111 of the corresponding pipe 11, which extends off the common axis L, to the second holding means 18 mounted on the second flat portion 16b of the holder member 16 or ,for example, inserting the part of the pipe extension 111 into a hole of a tube member welded on the holder member 16 to hold thereon. Then, the second connecting end 20 of the female connector 10 linked preliminarily with the resin tube 9 is joined with the insertion end 11a of the corresponding pipe 11 linked with the holder member 16. The female connector 10 with the resin tube 9 are turned about the common axis L relative to the insertion end 11a of the corresponding pipe 11 until the extension 91 of the resin tube 9 is fitted across the opening 19d of the engaging portion 19c of the C clip 19 which is the first holding means 17 mounted on the first flat portion 16a of the holder member 16. As the resin tube 9 remains held by the holder member 16, the axis of the C clip 19 intersects with an extension of the common axis L. The opening 19d of the C clip 19 is shaped for accepting the resin tube 9 from a radial direction of its axis.

As the resin tube 9 and the corresponding pipe 11 are held by the holder member 16, the resin tube 9 is inhibited from turning relative to the female connector 10 and simultaneously the corresponding pipe 11 is inhibited from turning relative to the female connector 10. Thus the female connector 10 and the corresponding pipe 11 can not relatively turn. As a result, an annular sealing member such as an o ring mounted in the housing of the female connector 10 can hardly be rubbed and worn out by the action of sliding over the periphery of the corresponding pipe 11, hence providing its excellent sealing effect for a long-run operation.

Figure 3:
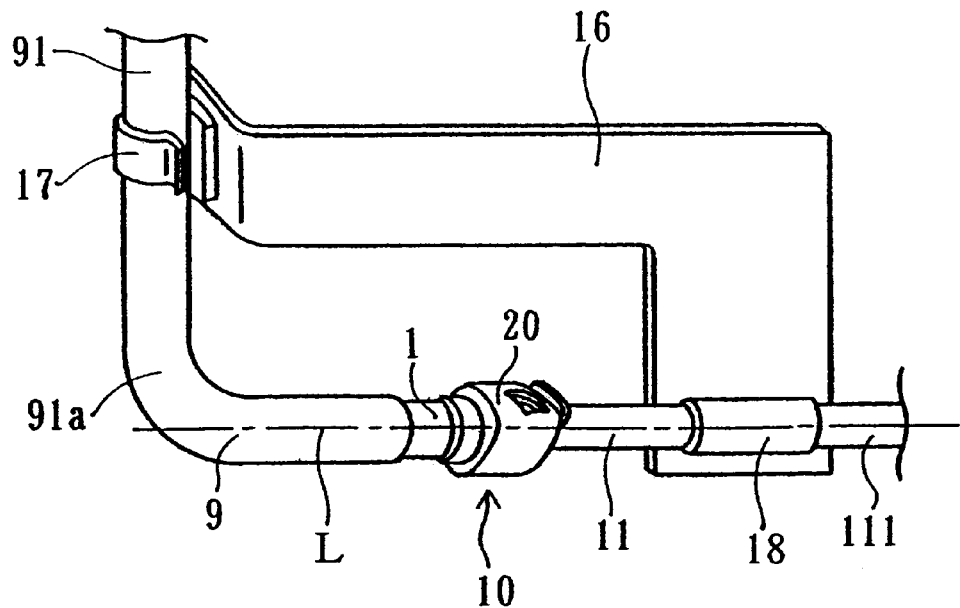
FIG. 3 is a perspective view schematically showing another embodiment of the piping structure according to the present invention.
Figure 4:
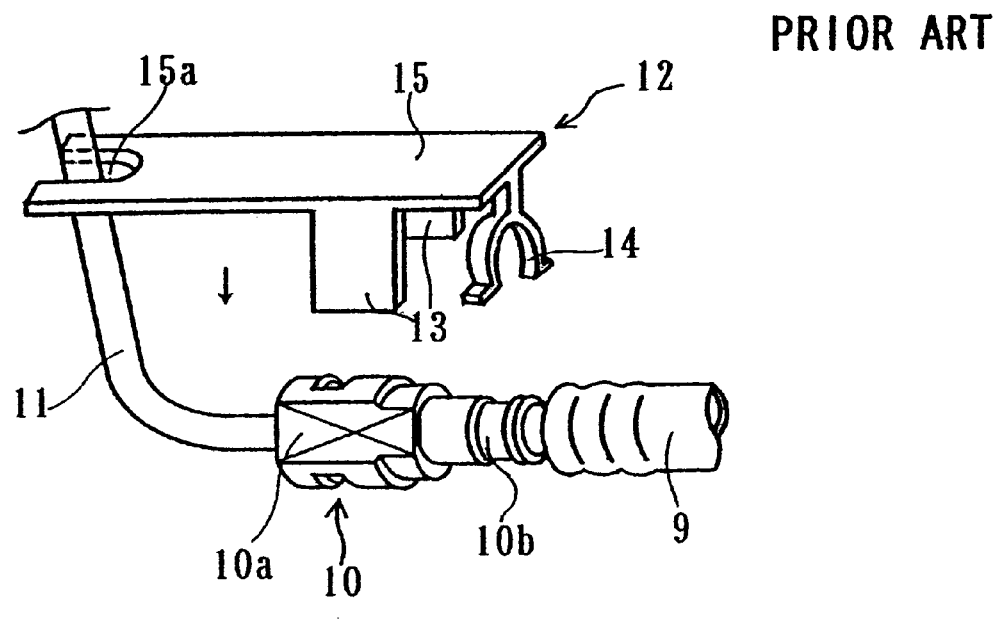
FIG. 4 is a perspective view schematically showing a conventional piping structure.

While both the tube extension 91 of the resin tube 9 and the pipe extension 111 of the corresponding pipe 11 as extensions of the resin tube 9 and the corresponding pipe 11 are provided of f the common axis L in the above embodiment, either the tube extension 91 or the pipe extension 111 may be aligned with the common axis L as shown in FIG. 3 as another embodiment. FIG. 3 illustrates another embodiment where the pipe extension 111 of the corresponding pipe 11 is aligned with the common axis L along which the insertion end 11a of the corresponding pipe 11 is inserted and joined to the second connecting end 20 of the female connector 10. While the pipe extension 111 of the corresponding pipe 11 is held by the second holding means 18 mounted by welding to the holder member 16, the resin tube 9 having a bent 91a is securely held at its tube extension 91, which extends vertical to the common axis L, by the first holding means 17 or the C clip 19 of the holder member 16. Alternatively, the tube extension of the resin tube may be aligned with the common axis L and securely held by the second holding means while the corresponding pipe is arranged to have a bent of the extension and securely held at its extension, which extends vertical to the common axis L, by the first holding means or the C clip.

The bent of the resin tube or the corresponding pipe is not limited to a particular shape. Also, the holder member for holding the bent is not limited to a particular shape such as shown in FIG. 1. The bent may be of any shape so long as both the holding portions of the resin tube and the corresponding pipe to be held are not aligned with the axis of the female connector. Moreover, the first and second holding means are not limited to those of the embodiments but may both be implemented by a C clip or any known appropriate means. The part of the holder member may also be anchored by bolts or the like to the chassis of a vehicle.

What is claimed is:

1. A piping structure having a female connector and a corresponding pipe to be connected with the female connector, both arranged to join each other while allowing no relative turning movements, comprising:

the female connector of a tubular shape having a first connecting end portion thereof extending straight for connection to a resin tube and a second connecting end portion thereof extending straight for connection to the corresponding pipe;

the resin tube fixedly inserted at one end to the first connecting end portion of the female connector and extending to the other end;

the corresponding pipe having an insertion end thereof arranged for joining coaxially and turnably by snap fastening to the second connecting end portion of the female connector and extending along the axial direction; and a holder member having a first holding means for holding an extension of the resin tube and a second holding means for holding an extension of the corresponding pipe, wherein when the insertion end of the corresponding pipe has been inserted into and joined coaxially and turnably with the second connecting end portion of the female connector along the common axis, either a tube extension of the resin tube or a pipe extension of the corresponding pipe which is arranged off the common axis is turned about the common axis until at least one portion of these extensions snaps and fits into at least one of the first and second holding means.

* * * * *